United States Patent [19]

Lee

[11] Patent Number: 4,516,178

[45] Date of Patent: May 7, 1985

[54] CYLINDER CROSSING DETECTION CIRCUIT FOR DISC DRIVE OR THE LIKE

[75] Inventor: Patrick S. Lee, Campbell, Calif.

[73] Assignee: Ampex Corporation, Redwood City, Calif.

[21] Appl. No.: 418,492

[22] Filed: Sep. 15, 1982

[51] Int. Cl.³ .............................................. G11B 21/08
[52] U.S. Cl. ..................................... 360/78; 318/616; 318/618
[58] Field of Search ...................... 360/78; 369/32–34, 369/41; 318/561, 618, 616

[56] References Cited

U.S. PATENT DOCUMENTS

| 3,597,750 | 8/1971 | Brunner et al. | 360/77 |
| 3,755,795 | 8/1973 | Sordello et al. | 360/78 |
| 4,331,987 | 5/1982 | Oda et al. | 360/78 |
| 4,381,526 | 4/1983 | McLaughlin et al. | 360/78 |
| 14,168,457 | 9/1979 | Rose | 360/78 |
| 14,314,291 | 2/1982 | Oda et al. | 360/78 |

FOREIGN PATENT DOCUMENTS 54-1005  6/1974  Japan ..................................... 360/78

OTHER PUBLICATIONS

R. K. Oswald, "Head Positioning Servo Design for the IBM 3344/3350 Disk Files", IEEE Transactions on Magnetics, vol. Mag 14, No. 4, 7/1978–pp. 176–177.
Commander et al., "Velocity Signal Generator", IBM TDB, vol. 17, No. 6, 11//1974–pp. 1774–1780.
Millman et al., Integrated Electronics Analog and Digital Circuits and Systems, N.Y., McGraw-Hill, 1972, pp. 568–569.

Primary Examiner—Jr. Cardillo
Assistant Examiner—Steven R. Garland
Attorney, Agent, or Firm—Harry G. Thibault; Joel D. Talcott

[57] ABSTRACT

An improved technique for the counting of servo tracks in a position servo system wherein a single pulse is produced upon each crossing of a reference level by the servo data demodulation signal, the width of which is determined by the velocity of the servo data head relative to the medium.

14 Claims, 46 Drawing Figures

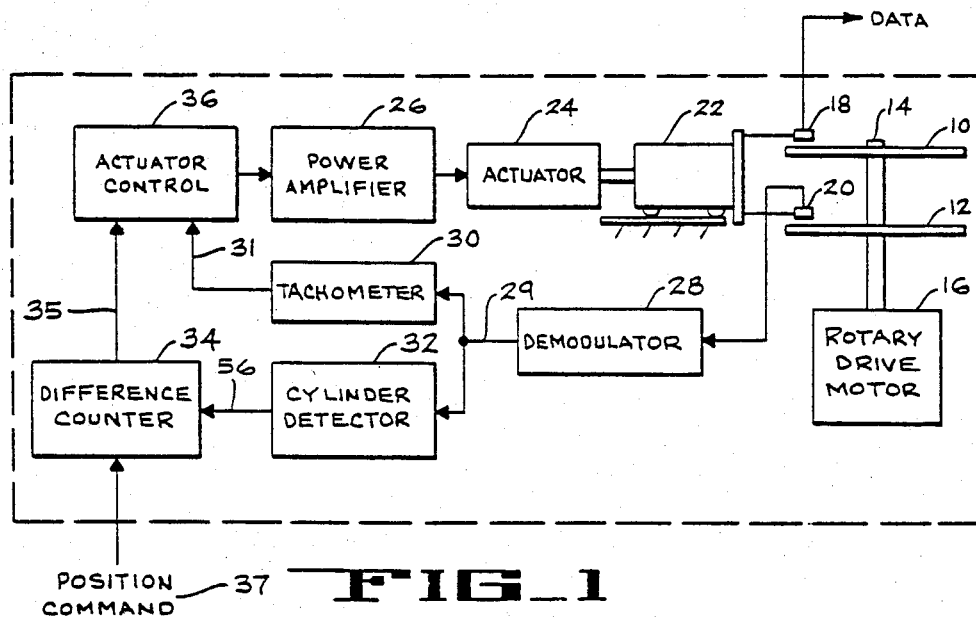
FIG_1
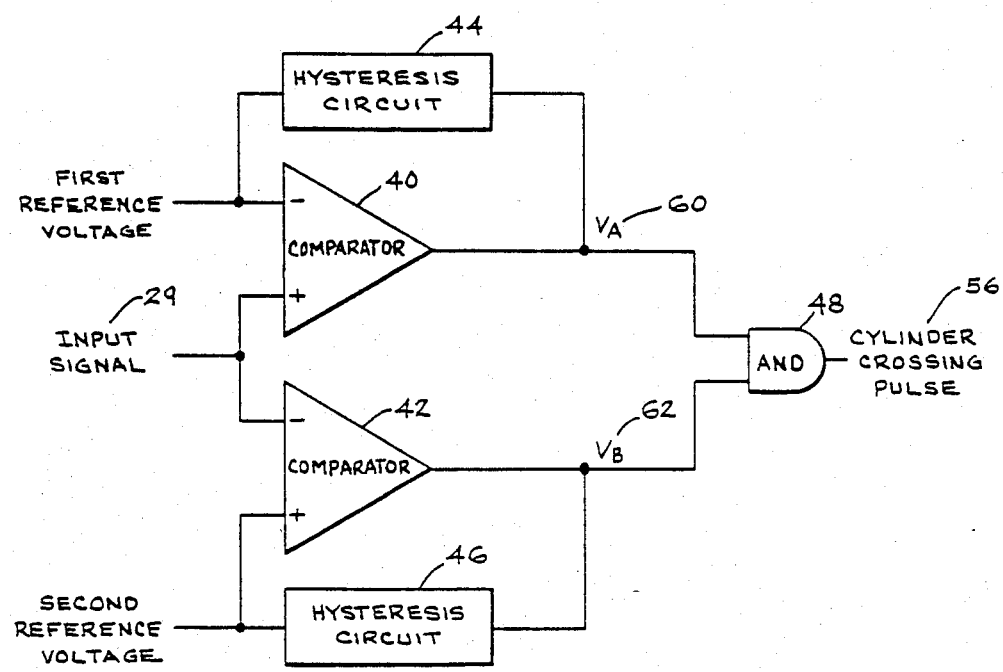
FIG_2 (PRIOR ART)

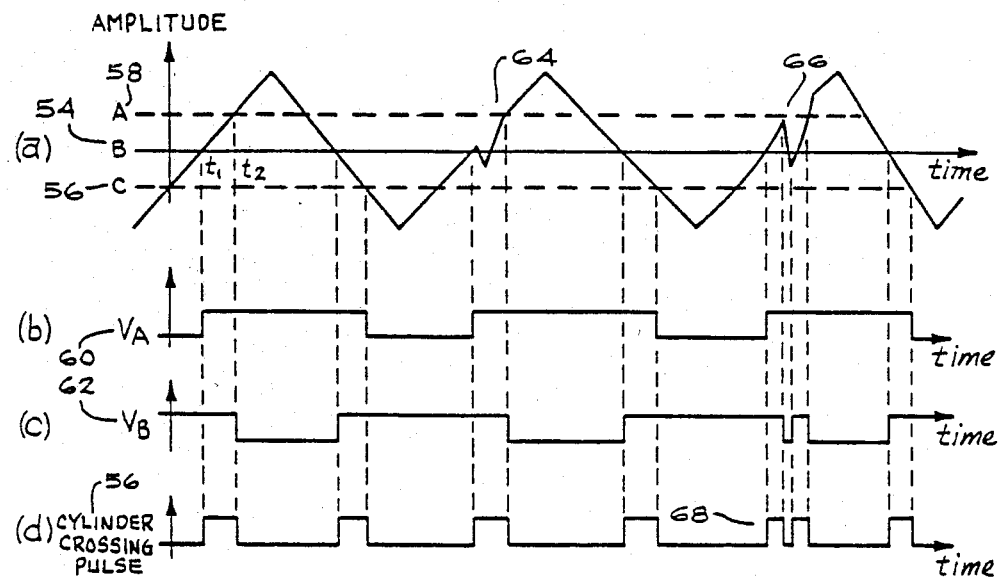
FIG_3 (PRIOR ART)
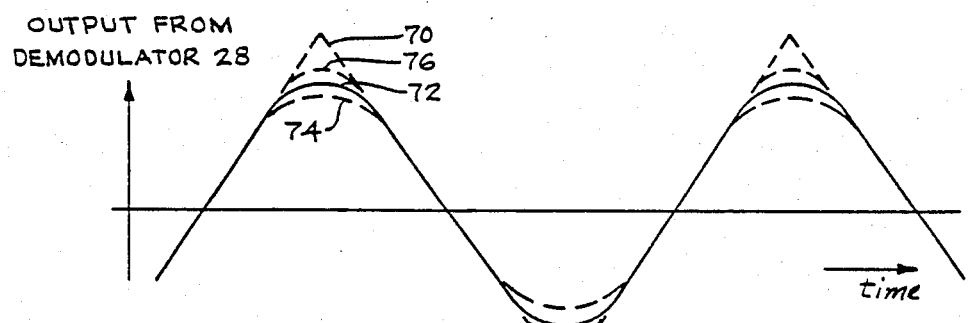
FIG_4 (PRIOR ART)
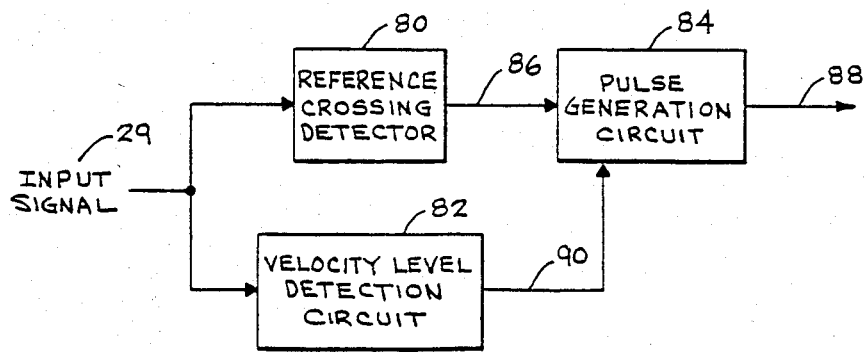
FIG_5

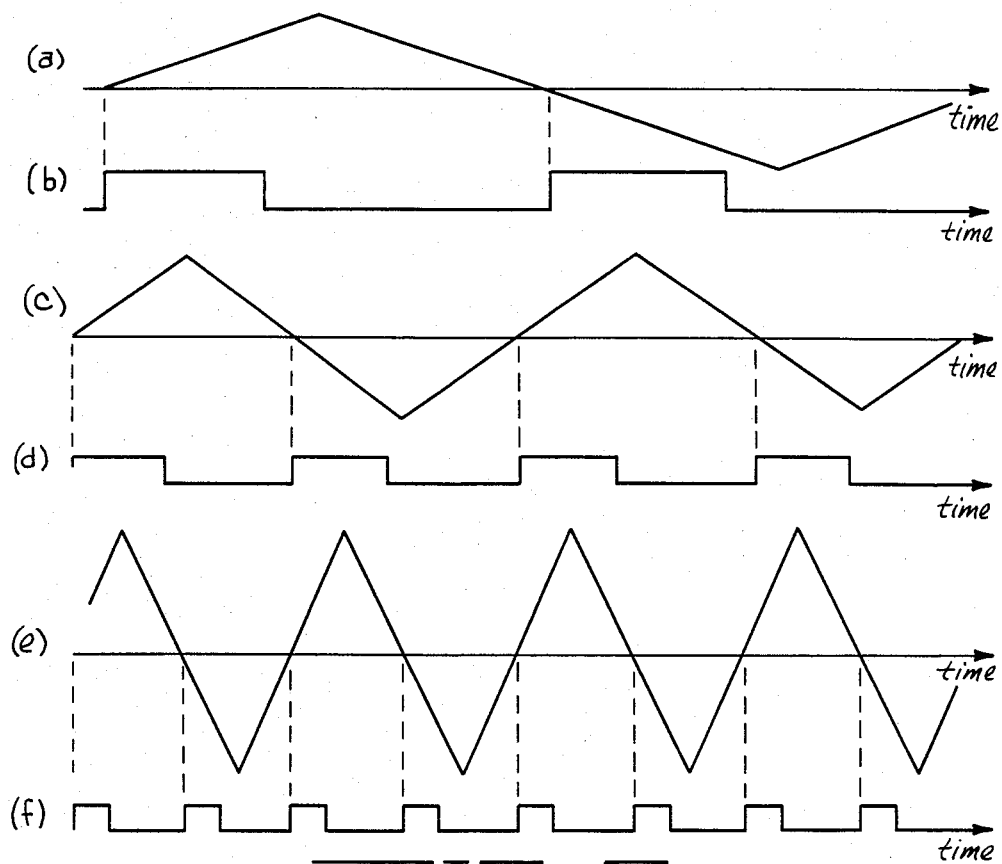
FIG_6
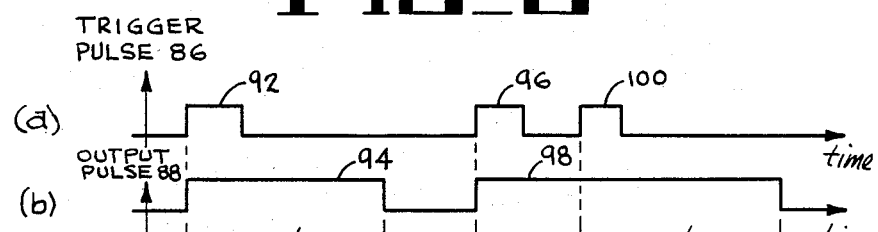
FIG_7
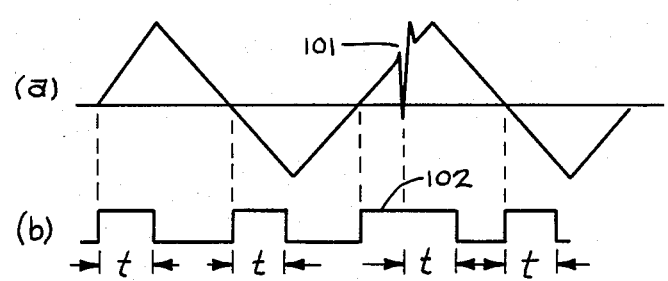
FIG_8

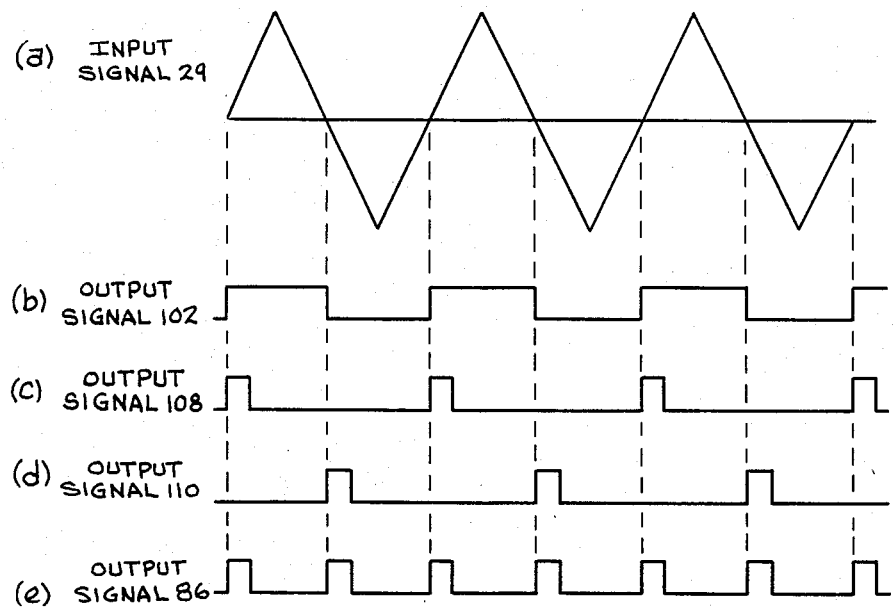
FIG_10
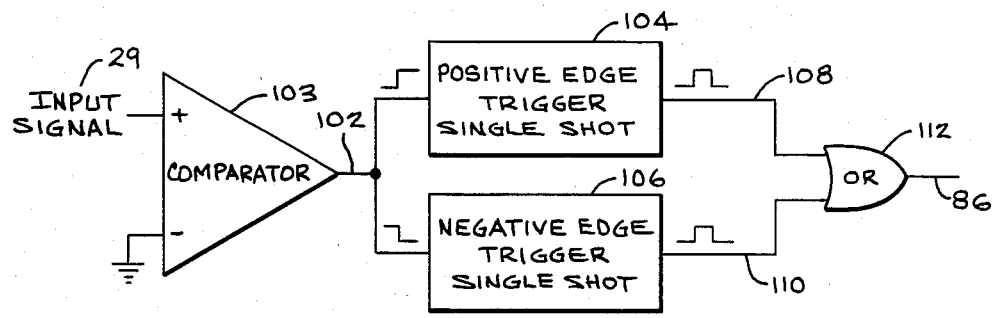
FIG_9
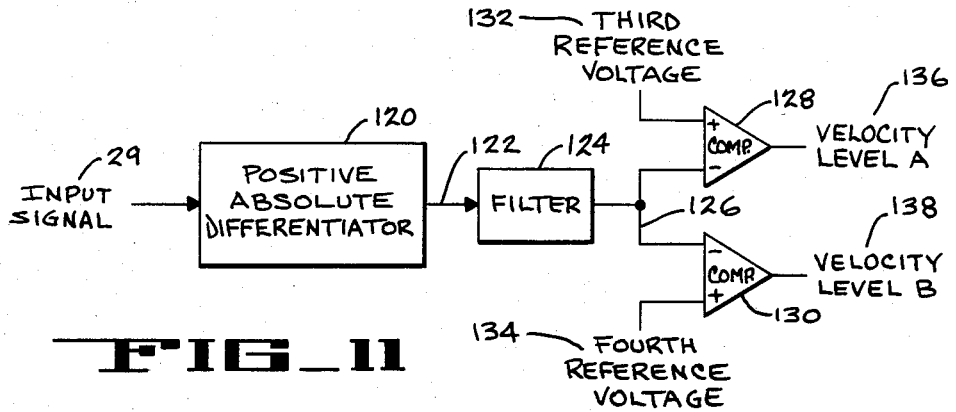
FIG_11

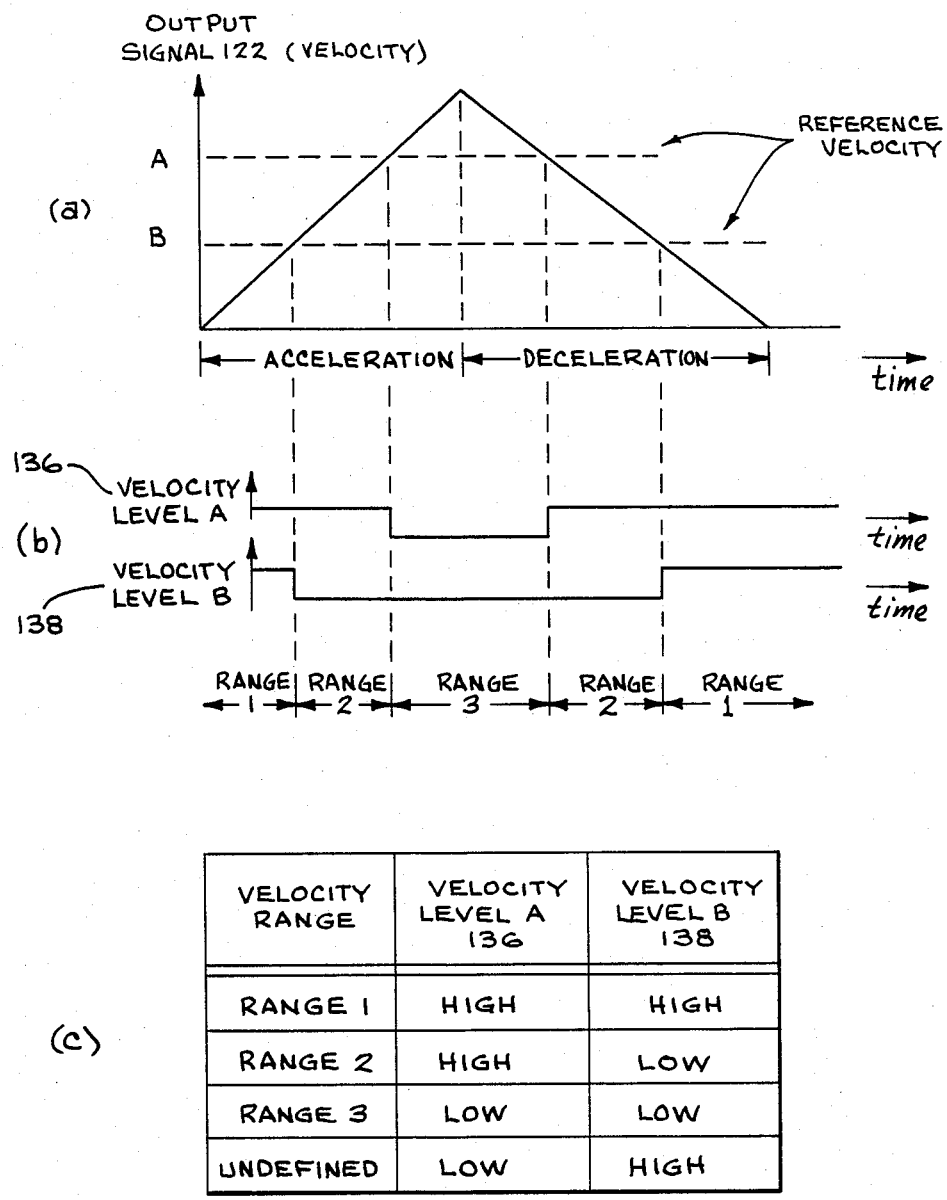
FIG_12

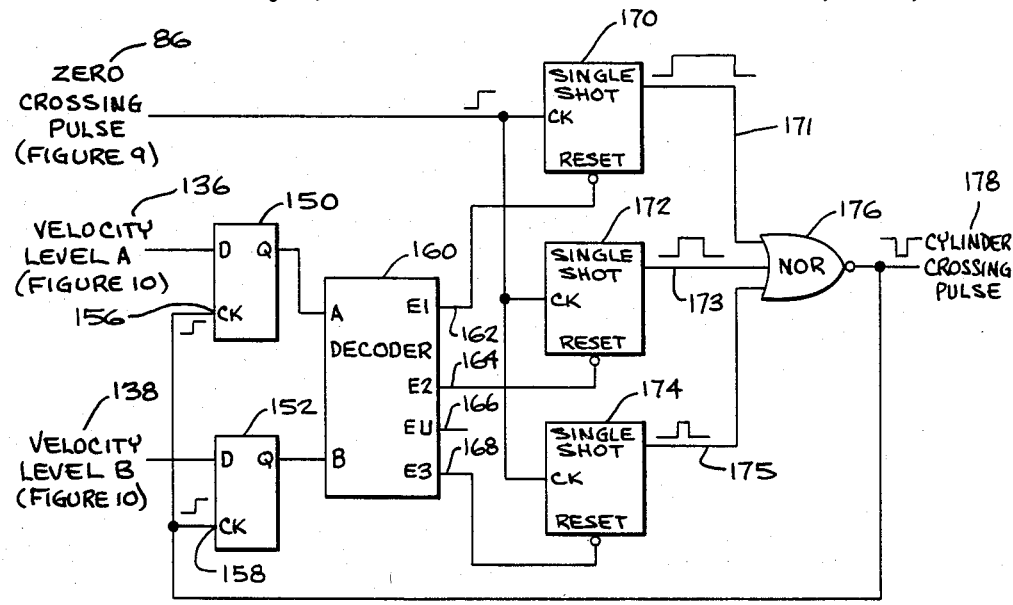
FIG_13
| VELOCITY RANGE (FIGURE 11(b)) | INPUT TO DECODER 160 | | OUTPUTS FROM DECODER 160 | | | |
|---|---|---|---|---|---|---|
| | A | B | $E_1$ | $E_2$ | $E_3$ | $E_U$ |
| RANGE 1 | H | H | H | L | L | L |
| RANGE 2 | H | L | L | H | L | L |
| RANGE 3 | L | L | L | L | H | L |
| UNDEFINED | L | H | L | L | L | H |
FIG_14
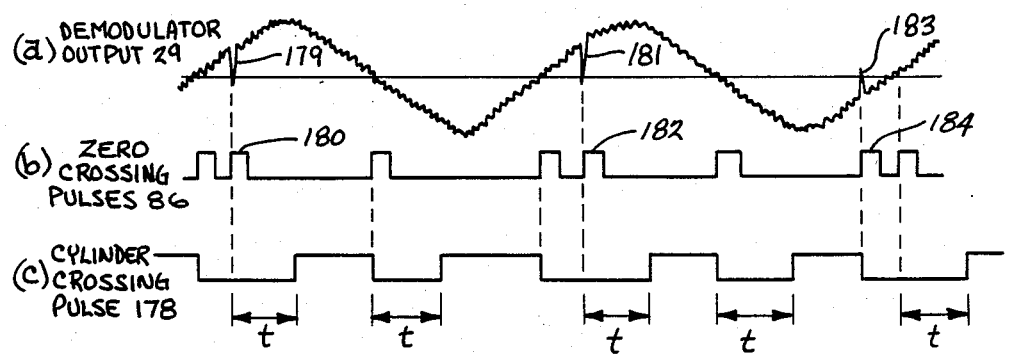
FIG_15

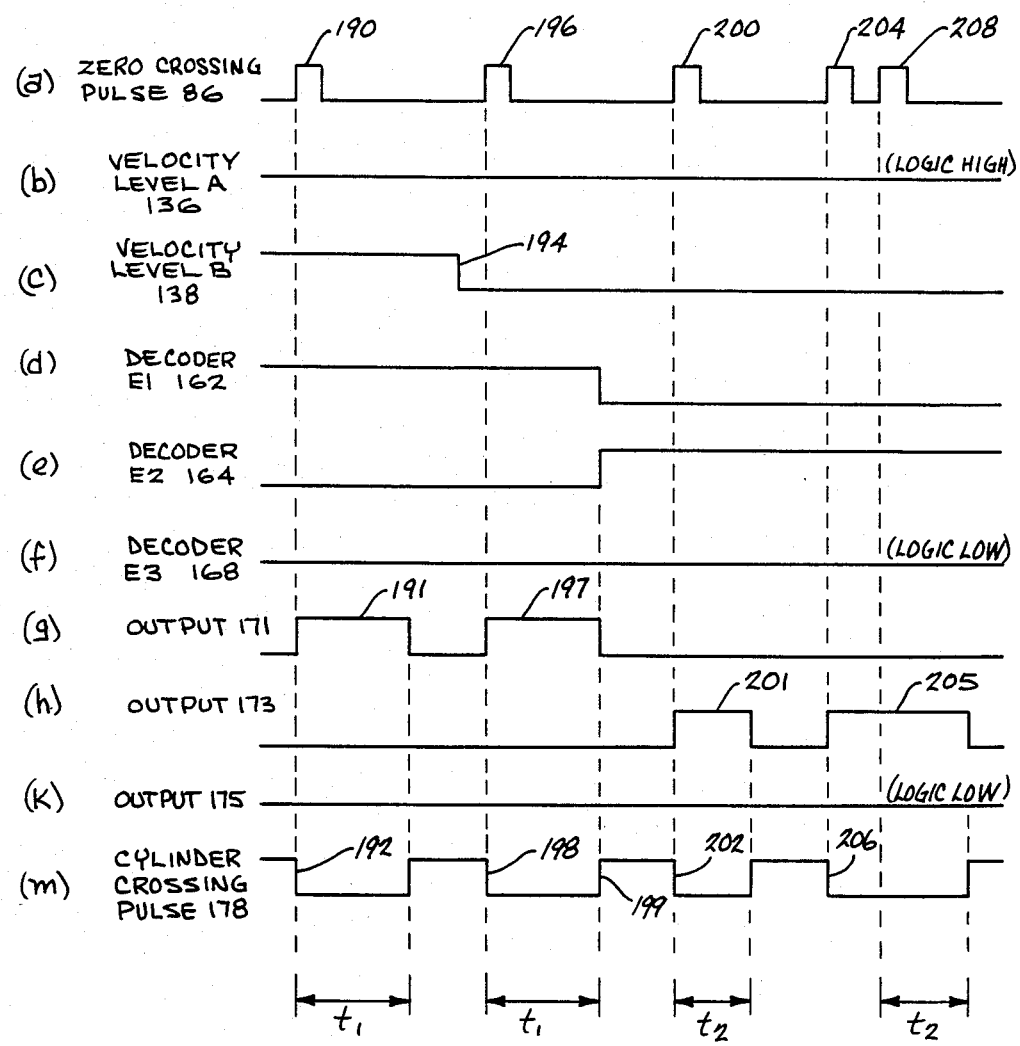

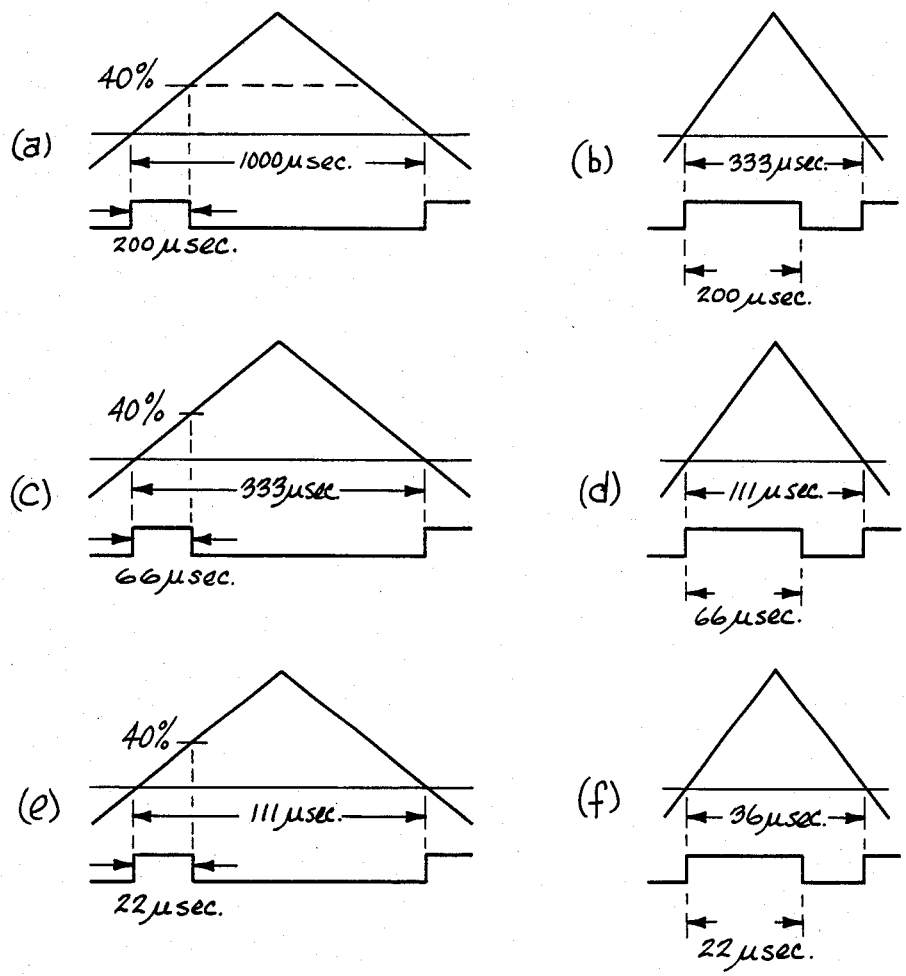
FIG_17

CYLINDER CROSSING DETECTION CIRCUIT FOR DISC DRIVE OR THE LIKE

BACKGROUND OF THE INVENTION

This invention relates generally to magnetic disc drive data storage devices and more particularly to an improved method for the accurate detection of the physical crossing of a transducer across cylinders of information recorded thereon.

A disc drive typically comprises a disc pack consisting of a plurality of magnetic recording discs each having a multiplicity of concentric recording tracks and being mounted on a drive spindle in stacked, slightly spaced relation to one another for common rotation about the spindle. The disc drive further comprises an array of magnetic heads disposed in read/write relation with the discs. In the case of moveable head drives, the heads are mounted on an actuator-driven carriage mechanism with at least one head operatively associated with each magnetic surface. In such drives the heads are usually moved substantially radially across the discs to access a desired track on any disc.

Information is stored on a surface of a disc by being recorded thereon in a serial format in concentric rings or tracks known in the art as cylinders. The concentric cylinders are arranged across the surface of a disc with varing radaii. The density at which cylinders are placed on a disc vary greatly, from sixty tracks per inch to over one thousand tracks per inch.

In either placing information on the disc or reading it therefrom, the magnetic head associated with the surface of the disc having the cylinder of interest is moved radially either in or out across the surface of the disc to position the head over the correct cylinder having the desired information. As information is stored on the surface of magnetic discs in cylinders it becomes necessary to be able to locate desired cylinders for the reading or writing of information thereon. Consequently a signal related to the radial motion of the carriage mechanism is necessary to properly locate the carriage mechanism carrying the heads over the desired cylinder.

In some prior art disc drives, a signal related to the radial motion of the carriage mechanism is obtained by means of apparatus which includes an optical grating mounted for movement with the carriage mechanism and operating in combination with a light source and associated light detector fixedly positioned to each side of the grating. As the grating moves with the carriage mechanism, the light passing through the grating is modulated and the distance traveled by the heads determined by detecting the modulated light, thereby providing an accurate indication of head position relative to the tracks on the discs. An example of such a head positioning system is disclosed in U.S. Pat. No. 3,597,750, entitled Servo with AGC for Positioning a Magnetic Head, issued Aug. 3, 1971.

In newer disc drives the optical grating has been replaced by the use of position control servo data which is recorded directly on the surface of one of the magnetic discs. Such system typically includes a servo surface prerecorded on one disc surface in a disc pack and a servo head which cooperates with the servo surface and is mounted for movement in unison with the read-write heads associated with the disc data surfaces. The servo surface is prerecorded with a plurality of concentric magnetic tracks, and when the servo head moves radially across the tracks, the signal induced in the servo head varies between a maximum value when the servo head is in direct alignment with a track and a minimum value when the servo head is midway between two adjacent tracks. The servo head signal is demodulated to form a head position signal. In accessing a desired servo track, the moveable member containing the magnetic heads is then moved across many tracks, each of which is counted, until the desired track is reached.

In such a servo system, the waveform which results from the servo head as it moves over the concentric prerecorded magnetic tracks on the servo surface accordingly varies between minimum and maximum values as each track is crossed. By detecting and counting these changes, the location of the magnetic record/reproduce heads relative to the cylinders is known.

Typically the sensing of the waveform from the servo head is performed by use of level detectors with analog hysteresis. A common implementation of such a device includes comparators and associated hysteresis circuits. In such a circuit the threshold amplitudes depend strongly on the normal peak amplitude of the input signal, and consequently requires that the peak amplitude of the input signal be maintained very constant. This is essential for accurate level detection.

To achieve constant peak amplitude for the input signal at different linear velocities of the servo transducer, rather sophisticated automatic gain control and velocity controlled demodulation circuits have to be used in generating the signal to be supplied to the comparators and associated hysteresis circuits. Consequently prior art implementations employing such circuits are quite sensitive to the peak amplitude of the input signal, and require substantial efforts in the area of analog signal processing to maintain the desired constant level.

Furthermore, due to the properties of the process of magnetic recording and the demands of high track densities, the normal peak amplitude of the signal from the servo head is rounded off before reaching the ideal peak amplitude. This phenomenon has undesirable results when it is used with a circuit employing hysteresis, as it results in a reduction of the useable difference between the maximum and minimum values of the waveform from the servo data. This in turn results in the reduction of the amount of useable hysteresis in the circuit, and hence a reduction in the safety margin for noise.

In addition to the above described problems, circuits employing comparators with associated hysteresis circuits are very susceptible to noise on the input signals thereto with amplitudes which exceed the hysteresis switching levels. The occurrence of such transients on the input to such circuits could, depending upon the magnitude thereof and the associated hysteresis level, result in the switching of the circuit and the consequent generation of a false output. This in turn would result in an error in the count of the servo cylinders.

SUMMARY OF THE INVENTION

In a magnetic disc storage system comprising a plurality of magnetic discs, position information for the proper positioning of a moveable carriage assembly containing a plurality of magnetic read/write heads is derived from a head servo system. The head servo system includes a dedicated disc surface known as the servo data disc on which are recorded concentric bands of information which are used solely for positional purposes by the head servo system.

As the moveable carriage assembly moves the magnetic heads across the surfaces of the discs, a dedicated servo data head reads the concentric bands on the servo data disc, producing an analog signal which varies from a maximum value to minimum value as the servo data head moves across each concentric band, known as cylinders. By counting the number of times the signal from the servo data head crosses a reference level, the position of the moveable head assembly relative to the disc is known. The associated circuitry which detects the cylinder crossings is known as a cylinder crossing detector.

In accordance with the present invention, an improved cylinder crossing detector is described wherein a single pulse is produced for each cylinder which is crossed by the moveable head assembly. In particular, a pulse of relatively short duration is produced upon each crossing of the reference level by the servo data signal. The pulse so produced is used to trigger a single shot to produce a second pulse indicative of a cylinder crossing. The width of the second pulse is determined by the relative velocity of the head carriage assembly relative to the disc surface. The single shot employed has the characteristics that once triggered, the occurrence of a subsequent trigger pulse during the existence of an output pulse from the single shot will not result in the production of a subsequent pulse; to the contrary, the duration of the existing pulse from the signal will be extended.

It is hence an object of the present invention to provide for the detection of cylinder crossings by the servo head in such a manner that the detection is insensitive to the absolute amplitude as well as amplitude peak variations of the input signal.

It is a further object of the present invention to provide for an improved safety margin against noise which may be present on the input analog signal.

It is yet a further object of the present invention to reduce the sensitivities to media defects or servo data demodulation errors.

It is a further object of the present invention to provide for the detection of cylinder crossings by the servo head without the use of circuits employing hysteresis.

BRIEF DESCRIPTION OF THE DRAWINGS

FIG. 1 is a block diagram of a head position control for a disc servo position system.

FIG. 2 illustrates a prior art implementation of a cylinder detection circuit.

FIG. 3, consisting of (a)–(d), is a series of waveforms labeled a–d illustrating operation which results from the circuit of FIG. 2.

FIG. 4 illustrates several of the peak variations which may occur on a demodulated servo data signal.

FIG. 5 is a generalized block diagram illustrating operation of a cylinder crossing detection circuit in accordance with the present invention.

FIG. 6, consisting of (a)–(f), is a series of waveforms, labeled a–f illustrating the operation of a portion of the operation of a cylinder crossing detection circuit in accordance with the present invention in response to changing periods on the input signal thereto.

FIG. 7, consisting of (a) and (b), illustrates the operation of the pulse generation circuit used in the cylinder crossing detection circuit in accordance with the present invention.

FIG. 8, consisting of (a) and (b), illustrates the response of a cylinder crossing detection circuit in accordance with the present invention to noise on the input signal thereto.

FIG. 9 illustrates one method for implementing the Reference Crossing Detector illustrated in FIG. 5 and the waveforms associated therewith.

FIG. 10, consisting of (a)–(e), illustrates several waveforms associated with the operation of the Reference Crossing Detector circuit illustrated in FIG. 9.

FIG. 11 illustrates one method for implementing the Velocity Level Detection Circuit of FIG. 5.

FIG. 12, consisting of (a)–(c), illustrates the input and the associated output waveforms produced by the Velocity Level Detection Circuit illustrated in FIG. 11.

FIG. 13 illustrates a circuit for implementing the Pulse Generation Circuit of FIG. 5.

FIG. 14 is a truth table illustrating the output of Decoder 160 appearing in FIG. 13.

FIG. 15, consisting of (a)–(c), illustrates an in input and the associated output waveform for the circuit illustrated in FIG. 13.

FIG. 16, consisting of (a)–(h), (k) and (m), is a timing diagram which illustrates the operation of the circuit of FIG. 13.

FIG. 17, consisting of (a)–(e), illustrates several waveforms useful in considering the desired periods for the single shots employed in one implementation of a cylinder crossing detection circuit employing the present invention.

DETAILED DESCRIPTION

Referring to FIG. 1, a disc drive comprises a pair of magnetically coated recording discs 10 and 12, each having a multiplicity of concentrically disposed recording tracks on at least one surface and being mounted on a shaft 14 which is driven by a rotary drive motor 16. Magnetic read/write heads 18 and 20 are operatively associated with discs 10 and 12 respectively. As the discs are rotated, a carriage 22 on which the heads are mounted is moved radially across the discs by actuator 24 to position the heads adjacent to particular data tracks. Disc 12 has prerecorded thereon patterns of information in concentric rings which are used exclusively in connection with positioning apparatus to accurately position head 18 over a desired cylinder of information, and is referred to in the art as a servo data disc. Head 20 is also referred in the art as servo data head. Actuator 24 is energized by power amplifier 26 to move and stop carriage 22 and consequently heads 18 and 20 in unison at any track on the disc surfaces.

Disc 12 and head 20 function as part of a servo mechanism for controlling the position of head 18 relative to disc 10 on which data is to be read or recorded. A typical disc drive usually comprises a plurality of data discs (10) and associated heads (18), arranged in a stack on shaft 14 such that corresponding data tracks of all the data discs are disposed one above the other in cylindrical fashion.

In operation of the disc drive, servo data detected by head 20 is applied to a demodulator 28. Demodulator 28 produces a waveform which varies from a minimum value to a maximum value as head 20 passes over each of the concentric servo data tracks on disc 12. Consequently the waveform produced by demodulator 28 is representative of linear displacement of the head carriage 22, and is applied to a tachometer 30 and cylinder detector 32.

Cylinder detector 32 produces a single pulse for each track or cylinder of servo data which head 20 crosses on servo disc 12 as head carriage 22 moves heads 18 and 20 radially across the surfaces of discs 10 and 12. The pulses so produced by cylinder detector 32 are supplied to difference counter 34 which keeps track of the exact instantaneous location of heads 18 and 20 relative to the cylinders of recorded information on disc 10 and 12 by counting the number of cylinder crossings detected by head 20 as it moves across servo data disc 12.

Difference counter 34 also receives position command 37 from an external control system which indicates the desired cylinder over which head 18 is to be positioned for the recording or playback of information. Difference counter 34 thereafter supplies the necessary signal to an actuator control 36 for the subsequent repositioning of head carriage 22. Actuator control 36 also receives a signal from tachometer 30 which indicates the relative speed and direction at which head carriage 22 and consequently heads 18 and 20 are currently moving. Based on signals 31 and 35 supplied from tachometer 30 and difference counter 34, respectively, actuator control 36 generates the necessary command signal for power amplifier 26 to drive actuator 24 to position head 18 over the desired cylinder on disc 10 in the minimum amount of time.

The ideal waveform produced by demodulator 28 in response to movement of head 20 over servo data tracks on disc 12 will vary between maximum and minimum values in response to said movement. The maximum value attained by the waveform occurs when servo head 20 is in direct alignment with a servo data track on disc 12, and the minimum value occurs when servo head 20 is midway between two adjacent servo data tracks.

Cylinder detector circuit 32 functions to count each cycle of the waveform generated by demodulator 28 and generate a pulse each time the waveform crosses zero. This has frequently been done by employing circuits whose outputs change state when the value of the input signal thereto exceeds a given predetermined value. In order to minimize the effects of noise on the input signal thereto, these circuits are designed such that the point on the input waveform at which a change in state occurs depends upon the current state of the circuit. A circuit exhibiting such a characteristic is said to employ hysteresis.

FIG. 2 illustrates a typical circuit employed in the prior art to detect cylinder crossings and is composed of two comparators 40 and 42 with associated hysteresis circuits 44 and 46. The outputs of comparators 40 and 42, $V_A$ and $V_B$ are connected to AND gate 48 the output of which forms a cylinder crossing pulse 56.

Each hysteresis circuit has associated therewith predefined levels with reference to the input waveform at which the circuit will change states. These are illustrated with reference to an assumed input waveform from demodulator 28 in FIG. 3(a). For the prior art circuit illustrated in FIG. 2, the levels associated with comparator 40 and hysteresis circuit 44 are B and C (FIG. 3(a)), and the levels associated with comparator 42 and hysteresis circuit 46 are A and B. An output 29 from demodulator 28 (FIG. 1) serves as the input to cylinder detector 32, and is hereinafter referred to as input signal 29 (FIG. 2).

The operation of the prior art cylinder detector circuit of FIG. 2, as well as the problems associated therewith, can best be understood by considering the output produced by comparators 40 and 42 and AND gate 48, as illustrated in FIGS. 3(b), 3(c) and 3(d) respectively, in response to input signal 29 on which noise 64 and 66 is present, as illustrated in FIG. 3(a).

It is observed that prior to time $t_1$, the output $V_A$ of comparator 40 is in a low state (FIG. 3(b)). However after input signal 29 has crossed level B (FIG. 3(a)) at time $t_1$, the output $V_A$ of comparator 40 will switch to a high state. Thereafter, the output $V_A$ of comparator 40 will remain in a high state until the level of input signal 29 crosses level C (FIG. 3(a)), after which point the output of $V_A$ of comparator 40 will return to a low state. The difference in switching levels B and C, i.e., the first change from a low state to a high state at level B, and the subsequent switching back to the previous low state at a level different from B, i.e., C, of comparator 40 and hysteresis circuit 44 is referred to as hysteresis.

Likewise, prior to time $t_2$ the output $V_B$ of comparator 42 (FIG. 2) is in a high state (FIG. 3(c)). However, after input signal 29 exceeds level A the output $V_B$ of comparator 42 changes to a low state. Thereafter the output $V_B$ of comparator 42 will remain in a low state until the level of input signal 29 falls below level B (FIG. 3(a)), after which the output $V_B$ of comparator 42 will return to a high state. It will again be noted that the levels of the input signal 29 at which the output $V_B$ of comparator 42 changes from a high state to a low state and thereafter back from the low state to the previous high state are not equal.

By considering the respective outputs $V_A$ of comparator 40 and $V_B$ of comparator 42, as inputs to AND gate 48 it is clear that cylinder crossing pulse 56 is produced each time input signal 29 crosses level B, which in practice is often the reference level of interest (FIG. 3(d)), and terminates when the input signal crosses level A or level C.

The purpose of the hysteresis present in the cylinder detector circuit, i.e., the difference in switching levels, can best be understood by considering the response of the circuit of FIG. 2 to the presence of extraneous noise on input signal 29, as illustrated by discontinuities 64 and 66 on the waveform illustrated in FIG. 3(a). In considering the response to discontinuity 64 by the circuit of FIG. 2 it will be observed that when input signal 29 exceeds level B, the output $V_A$ changes from a low to a high state. However due to the necessity of the level of input signal 29 falling below level C before $V_A$ would change back to a low state, it is observed that discontinuity 64 has no effect on cylinder crossing pulse 56. This results from the fact that the amplitude of the discontinuity experienced on input signal 29 fell within the hysteresis levels associated with comparator 40. However this may not always be the case, as illustrated by discontinuity 66 in FIG. 3(a).

In considering the effect of discontinuity 66 on the output of the circuit of FIG. 2, it will be observed that the level of discontinuity 66 exceeds the hysteresis levels A and B of comparator 42, and consequently results in the output signal $V_B$ switching in response thereto. This results in the generation of an extraneous pulse 68 from the output of AND gate 48. In actual practice, such an occurrence would result in an error in the number of cylinders counted, and a corresponding error in the detected location of the heads relative to the discs.

In addition to the problems associated with noise, the input signal 29 from demodulator 28 (FIG. 1) seldom approaches the ideal shape indicated in FIG. 3(a) in actual practice. Rather the signal suffers from a number of short comings hereinafter discussed which directly effect the amplitude thereof. When considered in view of the techniques previously employed in detecting cylinder crossings, these short comings frequently result in incorrect counts of cylinder crossings.

Due to magnetic recording properties and the demands of high track densities, the normal peak amplitude of the output from demodulator 28 is rounded off before reaching the ideal peak amplitude. This is illustrated in FIG. 4. In practice, the resulting normal peak amplitude 72 frequently varies from a minimum value shown at 74 to a maximum value shown at 76. The average value of peak amplitude 72 is frequently approximately 75% of the ideal peak amplitude 70. This results in a corresponding reduction of the maximum amount of useable hysteresis in the cylinder detection circuit, and consequently limits the safety margins for noise protection. Furthermore, media defects and variations in the height of the magnetic heads above the surface of the servo data disc produce variations in the amplitude of the signal from demodulator 28, which can result in false outputs from cylinder crossing detection circuits employing fixed hysteresis. The problems inherent in employing circuits with fixed hysteresis become readily apparent.

In the present invention, immunity from absolute and peak amplitude variations on the signal from demodulator 28 (FIG. 1) is achieved by an approach which can best be understood by reference to FIG. 5.

In a cylinder crossing detection circuit employing the present invention, input signal 29 is simultaneously applied to a reference crossing detector 80 and a velocity level detection circuit 82. In response to each occurrence of input signal 29 crossing a predefined reference level, which in practice is frequently a zero volt level, reference crossing detector 80 produces an indication 86 thereof which triggers the generation of a single pulse 88 by pulse generation circuit 84. The width of the pulse produced by pulse generation circuit 84 is determined by the relative velocity of the heads 18 and 20 with respect to the surface of discs 10 and 12 (FIG. 1), as determined by the output 90 of the velocity level detection circuit 82.

This technique can be further understood by reference to the waveforms illustrated in FIG. 6. FIGS. 6(a), 6(c) and 6(e) illustrate the waveform present on input signal 29 at progressively increasing velocities of heads 18 and 20 with respect to disc 10 and 12 (FIG. 1). It is observed that the period of the waveform decreases as the velocity increases. FIGS. 6(b), 6(d) and 6(f) illustrate the corresponding pulses produced by the pulse generation circuit 89 of the present invention in response thereto.

From FIG. 6 it is readily apparent that the width of the pulse produced in response to the crossing of input signal 29 across the reference level (frequently a zero level) varies in direct proportion to the velocity of heads 18 and 20 with respect to discs 10 and 12. The advantage of this approach will become clear when the characteristics of pulse generation circuit 84 (FIG. 5) are further discussed below.

Pulse generation circuit 84 (FIG. 5) produces a single output pulse 88 in response to a "trigger" pulse applied to the input 86 thereto. The particular characteristic of pulse generation circuit 84 of interest herein is that once the production of an output pulse 88 has been initiated by the occurrence of a trigger pulse 86 on the input thereto, the subsequent occurrence of an additional trigger pulse on the input, prior to the completion of the output pulse produced in response to the initial trigger pulse, will not result in the production of an addition output pulse. To the contrary, the only effect on the output pulse currently in progress will be that the timing of the period thereof will begin anew. This is illustrated in FIG. 7.

Referring to FIG. 7(a), the occurrence of pulse 92 on input 86 of pulse generation circuit 84 (FIG. 5) results in the generation of output pulse 94 (FIG. 7(b)) having a duration of t. Thereafter, the occurrence of pulse 96 on input 86 will result in the generation of output pulse 98. However, the occurrence of a subsequent pulse 100 on input 86 prior to the completion of the output pulse initiated by pulse 96 results in the extension of the period of output pulse 98 by a time period t.

The advantage offered by a cylinder crossing detection circuit employing the present invention will become apparent upon considering FIG. 8. FIG. 8(a) illustrates the waveform of input signal 29 with the presence of noise pulse 101. FIG. 8(b) illustrates the response of a cylinder crossing detection circuit employing the present invention. It is observed that an output pulse is produced for each crossing of the waveform illustrated in FIG. 8(a), having a duration of t. However, upon the occurrence of noise pulse 101, it is observed that an additional output pulse in response thereto does not occur; to the contrary, the only net effect of the occurrence of noise pulse 101 is the lengthening of pulse 102 by a period equal to t.

It is also clear from FIG. 8 that certain constraints are present upon the width of the pulse produced in response to a crossing of the reference level by the input signal. It is clear that as long as the pulse is present, subsequent noise on the input signal cannot produce a subsequent separate pulse and hence an incorrect cylinder count. On the other hand, however, the occurrence of noise sufficient to retrigger the pulse presents the possibility of the extension of the period thereof beyond the half cycle of the input waveform, and could result in the subsequent missing of a following reference level crossing by the input waveform. These considerations will be treated hereafter.

FIG. 9 illustrates a preferred embodiment of the reference crossing detector 80 (FIG. 5). Input signal 29 is applied to the non-inverting input of comparator 103, the inverting input thereto being referenced to ground. The output 102 of comparator 103 is then simultaneously applied to a positive edge trigger single shot 104 and to a negative edge trigger single shot 106. The outputs 108 and 110 of positive edge trigger single shot 104 and negative edge trigger single shot 106, respectively, are each applied to the inputs of OR gate 112 which in turn, produces output 86.

FIG. 10 illustrates the waveforms associated with the preferred embodiment of the reference crossing detector illustrated in FIG. 9: input signal 29 (FIG. 10(a)), output 102 of comparator 103 (FIG. 10(b)), and outputs 108 (FIG. 10(c)), 110 (FIG. 10(d)) and 86 (FIG. 10(e)), of positive edge trigger single shot 104, negative edge trigger single shot 106, and OR gate 112, respectively.

Comparator 103 functions to compare input signal 29 (FIG. 10(a)) with a reference level, which in the implementation shown in FIG. 9 is zero volts, and produces an output signal 102 (FIG. 10(b)) which is a constant positive value when input signal 29 is greater than zero volts and is a constant negative value when input signal 29 is less than zero volts. Positive edge trigger single shot 104 produces an output pulse on output signal 108

(FIG. 10(c)) of fixed duration upon each transition of the output signal 102 of comparator 103 from a low to a high level, i.e., every time input signal 29 crosses the zero volt level with a positive slope. Negative edge trigger single shot 106 produces an output pulse on output signal 110 (FIG. 10(d)) of fixed duration upon each transition of the output 102 of comparator 103 from a high to a low level, i.e., every time input signal 29 crosses the zero volt level with a negative slope. The output signal 86 (FIG. 10(e)) from OR gate 112 is consequently a pulse upon every crossing of input signal 29 across the zero volt reference level.

FIG. 11 illustrates a preferred embodiment of the velocity level detection circuit 82 (FIG. 5). Input signal 29 is applied as an input to a positive absolute differentiator 120 which functions to perform the mathematical operation of differentiation upon the input signal 29 and then converts the result into positive absolute value. As input signal 29 represents relative position of heads 18 and 20 with respect to cylinders of data on discs 10 and 12 (FIG. 1), the differentiation thereof produces a signal 122 which is representative of the velocity thereof. This signal is then applied to filter 124 which functions to remove the high frequency components therefrom. The resulting signal 126 from filter 124 is simultaneously applied to the inverting inputs of comparators 128 and 130. A third reference voltage 132 is applied to the non-inverting input of comparator 128, and represents a velocity level A against which signal 126 will be compared. The output 136 from comparator 128 consequently will assume a first state when the input velocity signal 126 is less than reference velocity A represented by third reference voltage 132, and will assume a second state when the input velocity signal 126 is greater than reference velocity A represented by third reference voltage 132. Comparator 130 functions in a like manner, the only difference being in the reference velocity level against which signal 126 will be compared. Fourth reference voltage 134 represents this second velocity level B.

The significance of signals velocity levels A and B produced by comparators 128 and 130 can best be appreciated by referring to FIG. 12. FIG. 12(a) represents the output signal 126 after filtering by filter 124 from positive absolute differentiator 120, and consequently the velocity of heads 18 and 20 with respect to discs 10 and 12 (FIG. 1). The corresponding velocity level signals A and B produced by comparators 128 and 130 are illustrated in FIG. 12(b). FIG. 12(c) illustrates the velocity ranges indicated by the respective states of the output signals velocity level A and velocity level B produced by comparators 128 and 130 respectively. By referring to FIG. 12(c) it is clear that when both velocity level A and velocity level B are in a high state, the velocity of heads 18 and 20 with respect to discs 10 and 12 (FIG. 1) is within RANGE 1 (FIG. 12(b)). When velocity level A is in a high state and velocity level B is in a low state, the velocity at which heads 18 and 20 are moving with respect to discs 10 and 12 is within RANGE 2. When both velocity level A and velocity level B are in a low state, the velocity at which heads 18 and 20 are moving with respect to discs 10 and 12 is within RANGE 3. The state defined by velocity level A being in a low state and velocity level B being in a high state is undefined. Hence it is apparent that by reference to the two signals A and B provided by comparators 128 and 130, three unique velocity ranges are defined.

It is understood that output signals A and B (FIG. 11) represent output signal 90 from velocity level detection circuit 82 (FIG. 5).

FIG. 13 illustrates a preferred embodiment of the pulse generation circuit 84 illustrated in FIG. 5. The output signals A and B from comparators 128 and 130 (FIG. 11) are applied to the D inputs of D-type flip-flops 150 and 152. At an appropriate time, discussed hereinafter, the binary state of these two signals are clocked into the flip-flops 150 and 152 by the clock signal 178 being supplied to the clock inputs 156 and 158 thereto. This serves to store the current binary status of these two signals which is representative of the velocity range at which the heads 18 and 20 are moving relative to discs 10 and 12 (FIG. 1). Decoder 160 functions to decode the binary status of the velocity information stored in flip-flops 150 and 152.

The operation of decoder 160 can be further understood by reference to FIG. 14 which illustrates the binary outputs E1, E2, E3 and $E_U$ 166 from decoder 160 for each of the possible binary input states, and the corresponding velocity ranges indicated thereby. It is clear that the particular output of decoder 160 which exists in the high state at any one time is representative of the velocity range at which heads 18 and 20 are currently moving with respect to discs 10 and 12 (FIG. 1).

Referring once again to FIG. 13, the outputs E1, E2 and E3 from decoder 160 are respectively applied to the RESET inputs of single shots 170, 172 and 174.

Single shots 170, 172 and 174 each function in the following manner. Each single shot, upon the application of a low-to-high transition on its respective clock CK input, will generate an output pulse in response thereto of a fixed duration. The precise period of the respective output pulse is determined by individual parameters associated with each of the individual single shots, the determination of the period of which will be hereinafter discussed. However, application of a LOW level signal to the respective RESET input of a single shot will inhibit the generation of an output pulse in response to a triggering input applied thereto.

Referring once again to FIG. 13, it is clear that upon the occurrence of a zero crossing pulse 86, only one of single shots 170, 172 or 174 will be permitted to generate an output pulse in response thereto, depending upon which of decoder 160 output lines E1, E2 or E3 is in a high state. The particular output line of decoder 160 which is in the high state will determine which single shot will be permitted to generate an output pulse, and consequently determine the length of the output pulse so generated.

Each of the outputs from single shots 170, 172 and 174 are applied to the inputs of NOR gate 176. The output 178 from NOR gate 176 consequently is a single pulse generated upon each zero crossing of the output waveform from demodulator 28 (FIG. 1), the width of which is determined by the relative velocity of heads 18 and 20 with respect to discs 10 and 12. It should be noted that the output 178 from NOR gate 176 is active in the low state, i.e., NOR gate 176 provides a logical inversion of the pulses 171, 173 and 175 supplied as an input thereto.

The output 178 from NOR gate 176 is supplied to the clock CK inputs of D-type flip-flops 150 and 152 to clock in the current binary state representative of velocity. As the clocking of information into a D type flip-flop occurs on the low-to-high transition of the signal applied to the CK input, it is clear that the operation of single shots 170, 172 and 174 will not be disturbed by any change which may otherwise take place on the outputs from decoder 160. In other words, whenever anyone of the three single shots is triggered, the decoder 160 outputs, i.e., selection of velocity range, are not allowed to change until the output pulse of the single shot terminates.

The operation of the foregoing described implementation of the present invention can be better understood by reference to FIGS. 15 and 16.

FIG. 15(a) represents a typical output waveform 29 from demodulator 28 (FIG. 1). FIG. 15(b) illustrates the corresponding signal 86 (FIG. 10(e)) produced by the implementation of reference crossing detector 80 (FIG. 5). FIG. 15(c) illustrates the resulting cylinder crossing pulses 178 (FIG. 13) produced in response thereto by the present invention for a single velocity range. It is observed from FIG. 15(b) that pulses 180, 182 and 184 represent extraneous pulses produced by noise 179, 181 and 183 present on the waveform illustrated in FIG. 15(a). When such pulses are applied to single shots 170, 172 and 174 (FIG. 13) each would result in the retriggering of the selected single shot, rather than the production of an additional cylinder crossing pulse.

FIG. 16 illustrates waveforms associated with the operation of the circuit implementation illustrated in FIG. 13. The zero crossing pulse 86 waveform present on the CK input to single shots 170, 172 and 174 is illustrated in FIG. 16(a), as are the velocity level A and velocity level B waveforms present on the D inputs to flip-flops 150 and 152 illustrated in FIGS. 16(b) and 16(c) respectively. The corresponding output waveforms E1, E2 and E3 from decoder 160 are illustrated in FIGS. 16(d), 16(e) and 16(f) respectively. The output waveforms 171, 173 and 175 from single shots 170, 172 and 174 are illustrated in FIGS. 16(g), 16(h) and 16(k). The resulting output 178 from NOR gate 176 is illustrated in FIG. 16(m).

Upon the occurrence of pulse 190 (FIG. 16(a)), decoder 160 output E1 (FIG. 16(d)) is in a high state, which enables single shot 170 to produce an output pulse 191 (FIG. 16(g)) of a duration $t_1$ previously defined by parameters associated with single shot 170. A corresponding cylinder crossing pulse 192 of duration $t_1$ (FIG. 16(m)) is produced.

Assume thereafter a change occurs in velocity from RANGE 1 to RANGE 2, as indicated by the high-to-low transition 194 on velocity level B (FIG. 16(c)). As this change will not be clocked into flip-flops 150 and 152 until after the occurrence of the next cylinder crossing pulse, decoder 160 output E1 will remain in a high state which, upon the occurrence of pulse 196 (FIG. 16(a)) will result in a single shot 170 again producing an output pulse 197 (FIG. 16(g)) which in turn produces cylinder crossing pulse 198 (FIG. 16(m)). However, upon the low-to-high transition 199 of pulse 198, the new velocity level will be clocked into flip-flop 152 and will be reflected in the change of decoder 160 output E1 from a high to a low state (FIG. 16(d)), and decoder 160 output E2 changing from a low to a high state (FIG. 16(e)). This indicates that there has been a change in the velocity of heads 18 and 20 relative to discs 10 and 12 (FIG. 1) from RANGE 1 to RANGE 2, and will consequently result in a change in the duration of the cylinder crossing pulse produced by the next zero crossing pulse 86.

Upon the occurrence of pulse 200 (FIG. 16(a)), single shot 172 will be enabled due to decoder 160 output E2 being in a high state, and will produce an output pulse 201 (FIG. 16(h)) in response thereto on output 173 having a duration of $t_2$. This pulse is reflected in the output from NOR gate 176 as pulse 202. As pulse 202 was produced by the triggering of single shot 172 (FIG. 13) during a period when the velocity of heads 18 and 20 with respect to disc 10 and 12 (FIG. 1) had changed from RANGE 1 to RANGE 2, the corresponding output pulse produced thereby will be shorter in duration than the pulse previously produced when the velocity of said heads was within RANGE 1. This can be observed by comparing the respective widths of pulse 202 with that of pulse 198 (FIG. 16(m)).

The occurrence of an extraneous pulse and the response of the circuit illustrated in FIG. 13 will now be illustrated. In the following discussion it will be assumed that the velocity of heads 18 and 20 with respect to disc 10 and 12 (FIG. 1) will remain within RANGE 2, i.e., decoder 160 output E2 will remain in a high state.

Referring once again to FIG. 16(a) the occurrence of pulse 204 will result in the triggering of single shot 172 and the subsequent generation of pulse 205 on output 173 (FIG. 16(h)). This results in the generation of output pulse 206 on the output of NOR gate 176 as illustrated in FIG. 16(m). However, prior to the termination of pulse 205 (FIG. 16(h)), assume that a subsequent pulse produced due to noise occurs on the input to single shot 172, as indicated by pulse 208 in FIG. 16(a). From FIG. 16(h) it is observed that the result therefrom will be to lengthen pulse 205 by an additional amount of time equal to the duration of a pulse normally produced by single shot 172.

In like manner the circuit of FIG. 13 will respond to the occurrence of zero crossing pulses when the velocity of the heads is within the range defined by RANGE 3, hence enabling decoder 160 output E3 and single shot 174, in a similar fashion. In particular, any number of velocity ranges may be defined, the choice being dependent upon particular considerations present in the application of the present invention.

The selection of the time periods for each of the respective single shots 170, 172 and 174 illustrated in FIG. 13 will now be considered. As previously referenced, several considerations are present, and the selection of the respective time periods is a subjective one and would consequently differ from application to application. However, the following example is given which will serve to illustrate the considerations present.

FIG. 17(a) illustrates a half cycle of an assumed input waveform having a basic triangular shape, and a half cycle period of 1000 microseconds. This represents the assumed lowest velocity of the corresponding transducer producing same. Assuming the pulse to be produced by the respective single shot to occupy 20% of this period, and consequently to reflect approximately 40% of the positive slope of the input waveform after crossing the zero reference level, a period of 200 microseconds results (20% of 1000 microseconds).

Now assuming that at the upper end of the first velocity range, the resulting pulse width to have a duration equal to 60% of the total half cycle for the input waveform; this would translate to a half cycle period of 333 microseconds (FIG. 17(b)) (200 microseconds divided by 60%). Consequently 333 microseconds would represent both the upper end of the first velocity range, and the lower end of the next velocity range.

In selecting the pulse width to be generated by a transducer moving at the low range of velocity present in the second range, the same basic guidelines applied to the previous velocity range is again applied. Consequently for the pulse to be produced by the respective single shot to occupy approximately 20% of the period and correspondingly reflect on 40% of the positive slope of the input waveform after crossing the zero reference level, a period of 66 microseconds results (FIG. 17(c)), (20% of 333 microseconds).

The same reasoning would be applied to define the upper limit of the second velocity range (FIG. 17(d)) and the lower limit of the third velocity range to be 111 microseconds (FIG. 17(e)) (66 microseconds divided by 60%). Similar reasoning would indicate that the upper end of the third velocity range to have a half cycle period of 36 microseconds (FIG. 17(f)) (22 microseconds divided by 60%).

The above described implementation of a cylinder crossing detector is only illustrative of one approach. In yet another implementation the duration of the pulse indicating a cylinder crossing could vary in direct proportion to the measured velocity of the moveable head assembly, rather than in one or a plurality of discrete ranges.

Such variation as well as others would be apparent to one of ordinary skill in the art, and the inventive concept herein is not to be limited thereby.

While the present invention has been described with regard to a magnetic disc system, it is not restricted to such and may be applied in other servo controlled systems such as optical data recording systems.

What is claimed is:

1. Apparatus for detecting position of a transducer moving with respect to tracks uniformly spaced on a medium, and having information thereon, comprising:
   means for moving the transducer with respect to said tracks, said transducer generating a position signal with respect to the tracks;
   proximity detecting means for detecting proximity of the transducer with respect to said tracks to said information for producing a first output;
   velocity detecting means for detecting velocity of said transducer relative to said medium for producing a second output and regulating the value thereof;
   a first means responsive to said first output for initiating a position indication; and,
   a second means responsive to said second output and cooperative with said first means for controlling duration of said position indication.

2. Apparatus responsive to a position signal for detecting position of a transducer moving with respect to tracks uniformly spaced on a medium and having information thereon, comprising:
   means for moving the transducer with respect to said tracks, said transducer generating a position signal with respect to the tracks;
   proximity detection means responsive to the position signal with respect to said tracks for producing a first output;
   velocity detecting means for detecting velocity of the transducer relative to the medium for producing a second output and regulating the value thereof;
   a first means responsive to said first output for initiating a position indication; and,
   a second means responsive to said second output and cooperative with said first means for controlling duration of said position indication.

3. Apparatus as recited in claim 2, wherein said proximity detecting means further comprises:
   comparator means for comparing said position signal with a pre-defined reference level for producing a first signal when the position signal is greater than the pre-defined reference level and for producing a second signal when the position signal is less than the predefined reference level;
   indicating means responsive to the first and second signal of said comparator means for producing an indication in response to each.

4. Apparatus as recited in claim 1 or 2, wherein said velocity detection means further comprises:
   velocity level detection means for comparing the velocity of the transducer relative to the medium with a plurality of pre-defined velocities for producing an output.

5. Apparatus as recited in claim 1 or 2, wherein said first means further comprises:
   pulse generation means for producing a pulse in response to the output of the proximity detection means.

6. Aparatus as recited in claim 1 or 2, wherein said second means further comprises:
   means for controlling the duration of said position signal in an inverse relation with respect to the output of said velocity detection means.

7. A method for detecting position of a transducer moving with respect to tracks uniformly spaced on a medium and having information thereon, comprising the steps of:
   moving the transducer with respect to said tracks, said tranducer generating a position signal with respect to the tracks;
   detecting proximity of the transducer to said tracks having information for producing a first output;
   detecting velocity of said transducer relative to said medium for generating a second output and regulating the value thereof;
   initiating an indication in response to the first output; and,
   controlling the duration of the indication of the first output in response to the second output.

8. Apparatus responsive to a position signal for detecting position of a transducer moving with respect to tracks uniformly spaced on a medium and having information thereon, comprising:
   means for moving the transducing with respect to said tracks, said transducer generating a position signal with respect to the tracks;
   zero crossing detector means responsive to said position signal for detecting equality between said position signal and a pre-defined reference level;
   velocity detection means responsive to said position signal for producing an output proportional to the velocity of the transducer; and
   pulse generation means responsive to said zero crossing detector means and cooperative with said velocity detection means for producing a pulse having a duration responsive to said velocity detection means output.

9. Apparatus as recited in claim 8, wherein said pulse generation means further comprises:

pulse width control means for controlling the duration of the pulse in inverse proportion to the output produced by said velocity detection means.

10. Apparatus for controlling the position of a magnetic head relative to a storage medium having tracks of information recorded thereon in uniformly spaced relation from an initial position to a terminal position comprising:
   means for moving the magnetic head with respect to said tracks;
   detection means for detecting the crossing of the magnetic head across tracks of information on the storage medium;
   velocity determining means for determining the velocity of the magnetic head relative to the storage medium;
   indicating means responsive to said detection means and said velocity determining means for producing an indication of the crossing of the magnetic head across areas of information of the storage medium;
   counting means responsive to said indicating means for determining distance remaining between the current position and the desired position for producing a distance remaining indication the velocity determining means, the indicating means, and the counting means cooperatively related; and,
   control means responsive to the cooperative relationship between said velocity determining means, said counting means, and said indicating means for positioning the magnetic head.

11. Apparatus as recited in claim 10, wherein said indicating means further comprises:
   pulse generation means responsive to said detection means and said velocity determining means cooperative with said pulse generating means for producing a pulse in response to said detection means having a duration proportional to the velocity of the magnetic head relative to the storage medium.

12. Apparatus for detecting cylinder crossings of a magnetic head in a disc system having a servo data disc and a servo data head from a signal from the servo data head, comprising:
   means for moving the magnetic head with respect to the cylinder crossings;
   proximity detecting means for detecting proximity of the servo data head to a cylinder for producing a first output;
   velocity detecting means for detecting velocity of the servo data head relative to the servo data disc for generating and regulating the value of a second output;
   a first means responsive to said first output for initiating a cylinder crossing indication; and,
   a second means responsive to said second output and cooperative with said first means for controlling the duration of said cylinder crossing indication.

13. Apparatus as recited in claim 12 further comprising
   pulse generation means responsive to the first output for producing a pulse having a duration inversely proportional to the second output.

14. Apparatus as recited in claim 13, wherein said pulse generation means further comprises:
   inhibiting means for inhibiting the production of a pulse from said pulse generation means in response to the first output during the existence of a pulse from said pulse generation means.

* * * * *